US006945774B2

(12) United States Patent
Shoeb

(10) Patent No.: US 6,945,774 B2
(45) Date of Patent: Sep. 20, 2005

(54) GAS BURNER WITH FLAME STABILIZATION STRUCTURE

(75) Inventor: Mohammed Shoeb, Hoffman Estates, IL (US)

(73) Assignee: Weber-Stephen Products Co., Palatine, IL (US)

( * ) Notice: Subject to any disclaimer, the term of this patent is extended or adjusted under 35 U.S.C. 154(b) by 0 days.

(21) Appl. No.: 10/385,170

(22) Filed: Mar. 7, 2003

(65) Prior Publication Data

US 2004/0173200 A1 Sep. 9, 2004

(51) Int. Cl.$^{7}$ .................................................. F23D 14/62
(52) U.S. Cl. ...................................... 431/354; 126/39 R
(58) Field of Search ........................ 431/354; 126/39 R, 126/42

(56) References Cited

U.S. PATENT DOCUMENTS

| | | | | |
|---|---|---|---|---|
| 854,491 | A | 5/1907 | Haggerty et al. | |
| 1,151,188 | A | 8/1915 | Kelly | |
| 1,224,157 | A | 5/1917 | Fry | |
| 2,488,388 | A | 11/1949 | Evans | |
| 3,156,292 | A | * 11/1964 | Ross | 239/419.5 |
| 3,802,413 | A | 4/1974 | Pepin | |
| 3,871,355 | A | 3/1975 | Henry | |
| 4,089,258 | A | 5/1978 | Berger | |
| 4,126,117 | A | 11/1978 | Hastings | |
| 4,237,858 | A | 12/1980 | Goodnight et al. | |
| 4,267,816 | A | 5/1981 | Koziol | |
| 4,315,729 | A | 2/1982 | Tanaka et al. | |
| 4,323,017 | A | 4/1982 | Harris | |
| 4,373,505 | A | 2/1983 | Koziol | |
| 4,462,384 | A | 7/1984 | Hitch | |
| 4,478,205 | A | 10/1984 | Koziol | |
| RE31,738 | E | 11/1984 | Hastings | |
| 4,485,799 | A | 12/1984 | Perez | |
| 4,485,972 | A | 12/1984 | Freber | |
| 4,488,534 | A | 12/1984 | Koziol | |
| 4,561,419 | A | 12/1985 | Koziol | |
| 4,569,329 | A | 2/1986 | Cherryholmes | |
| RE32,133 | E | 5/1986 | Koziol | |
| 4,587,948 | A | 5/1986 | Haglund | |
| 4,598,692 | A | 7/1986 | Hitch | |
| 4,624,241 | A | 11/1986 | Cherryholmes | |
| 4,679,544 | A | 7/1987 | Koziol | |
| 4,686,957 | A | 8/1987 | Koziol | |
| 4,720,257 | A | 1/1988 | Beckham et al. | |
| 4,762,530 | A | 8/1988 | Koziol | |
| 4,773,384 | A | 9/1988 | Koziol | |
| 4,829,978 | A | 5/1989 | Schlosser | |
| 4,953,358 | A | 9/1990 | Grohmann | |
| 4,989,579 | A | 2/1991 | Murphy et al. | |
| 5,076,256 | A | 12/1991 | Raymer et al. | |
| 5,076,257 | A | 12/1991 | Raymer et al. | |
| 5,103,545 | A | 4/1992 | Riehl | |
| 5,127,824 | A | 7/1992 | Barker | |
| 5,129,312 | A | 7/1992 | Berger | |
| 5,291,875 | A | 3/1994 | Koziol | |
| 5,370,527 | A | 12/1994 | Hefling et al. | |
| 5,417,565 | A | 5/1995 | Long | |
| 5,421,319 | A | 6/1995 | Moore, Jr. et al. | |
| 5,516,282 | A | 5/1996 | Somerville | |
| 5,603,256 | A | 2/1997 | Charlson et al. | |

(Continued)

FOREIGN PATENT DOCUMENTS

| | | |
|---|---|---|
| GB | 2 075 175 | 11/1981 |

*Primary Examiner*—Alfred Basichas
(74) *Attorney, Agent, or Firm*—Baker & McKenzie; David I. Roche

(57) ABSTRACT

The present invention provides a gas burner such as for use in a barbecue grill with at least one row of burner ports in a linear arrangement along the burner and a flame stabilizing structure having a flame stabilizing port with an extent transecting the linear arrangement of the burner ports. The present invention further provides a flame stabilizer structure that is adapted as a standing pilot for relighting the burner port area in the event of extinguished flame.

26 Claims, 4 Drawing Sheets

U.S. PATENT DOCUMENTS

| | | | | | |
|---|---|---|---|---|---|
| 5,617,778 | A | | 4/1997 | Schroeter et al. | |
| 5,711,663 | A | | 1/1998 | Giebel et al. | |
| 5,743,727 | A | * | 4/1998 | Rodgers | 431/328 |
| 5,755,154 | A | | 5/1998 | Schroeter et al. | |
| 5,778,871 | A | | 7/1998 | Herring | |
| 5,782,230 | A | | 7/1998 | Linnebur et al. | |
| 5,803,727 | A | | 9/1998 | Long | |
| 5,873,355 | A | | 2/1999 | Schlosser et al. | |
| 6,003,506 | A | | 12/1999 | Long et al. | |
| 6,024,083 | A | | 2/2000 | Smirnov | |
| 6,038,965 | A | | 3/2000 | Thorndyke | |
| 6,071,571 | A | | 6/2000 | Lerch et al. | |
| 6,102,029 | A | | 8/2000 | Stephen et al. | |
| 6,283,114 | B1 | | 9/2001 | Giebel et al. | |
| 6,371,754 | B1 | | 4/2002 | Haynes | |
| 6,461,152 | B2 | * | 10/2002 | Wood et al. | 431/354 |
| 6,561,795 | B1 | * | 5/2003 | Lasagni et al. | 431/354 |

* cited by examiner

FIG. 3
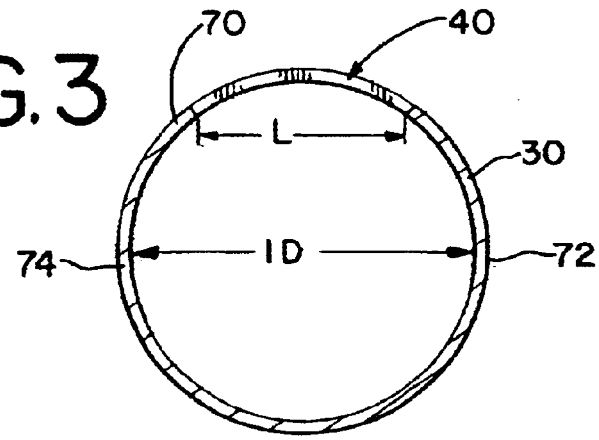
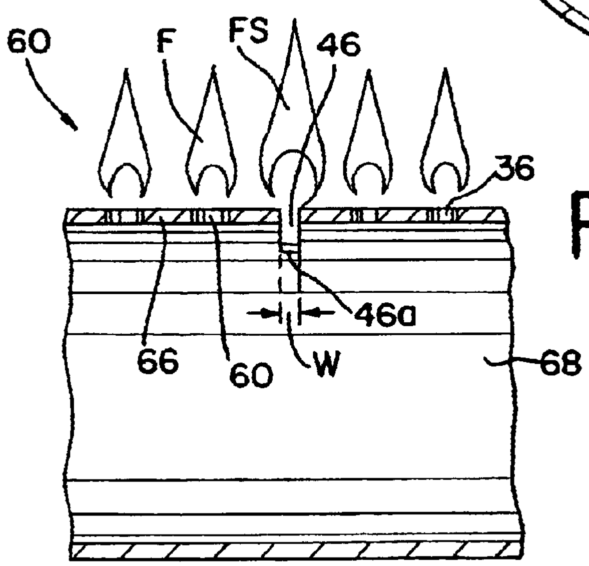
FIG. 4
FIG. 5
PRIOR ART
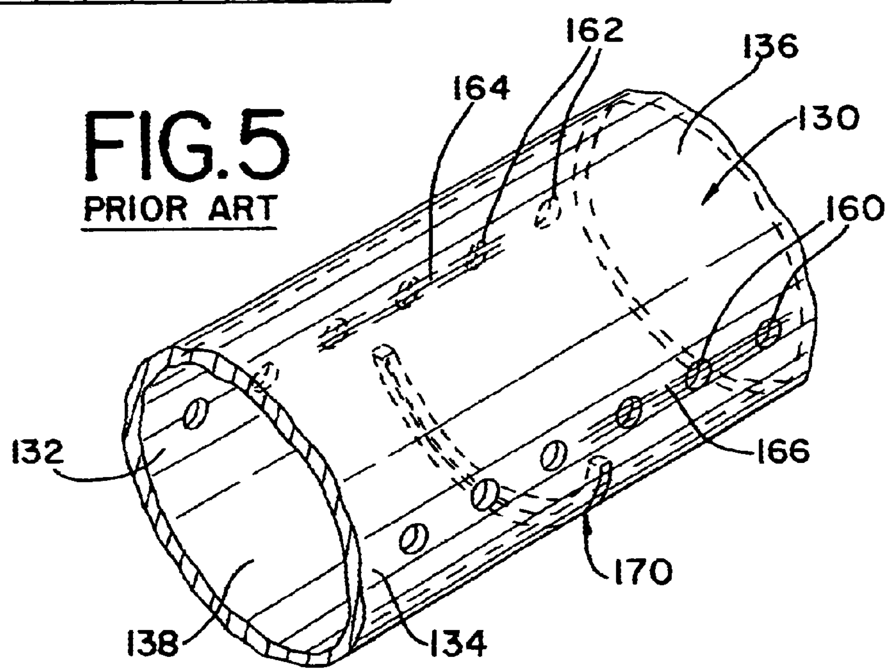

FIG.6
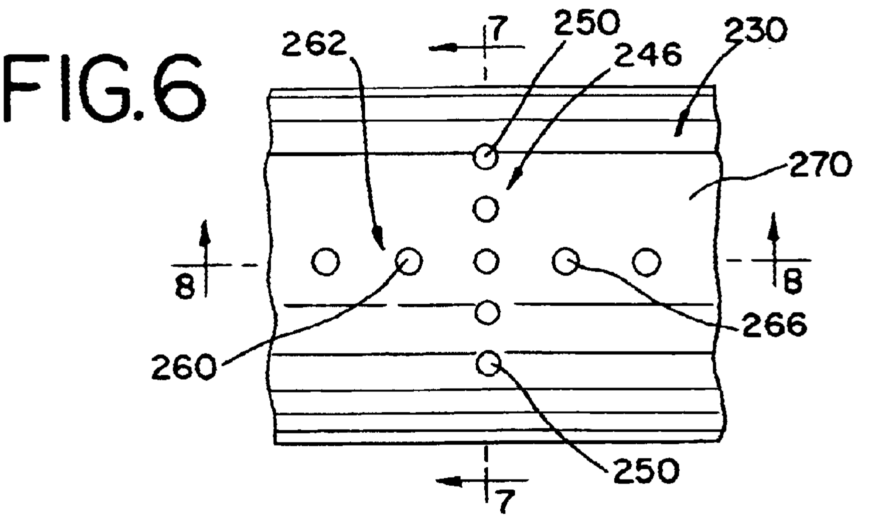
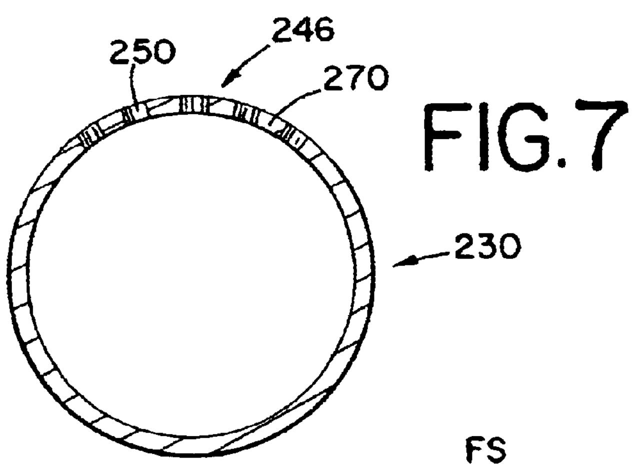
FIG.7
FIG.8
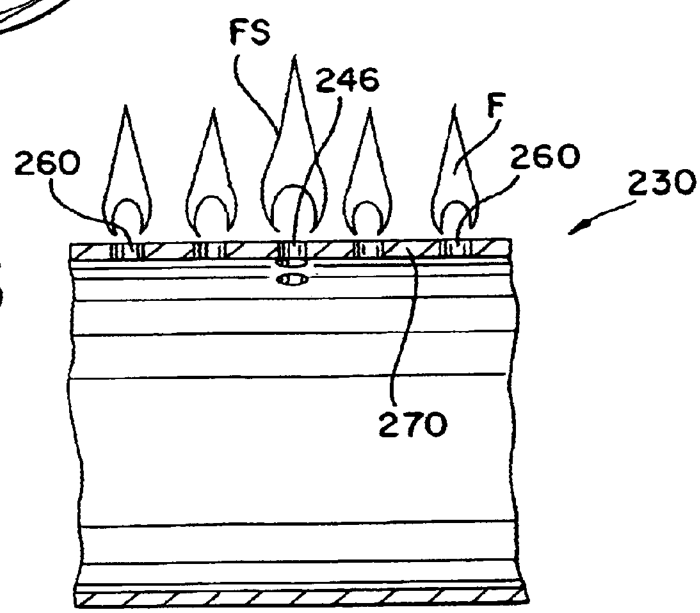

GAS BURNER WITH FLAME STABILIZATION STRUCTURE

TECHNICAL FIELD

The present invention relates to a gas burner. More specifically, the present invention relates to a gas burner tube having at least one stabilization structure that maintains and stabilizes the flame region of the burner tube.

BACKGROUND OF THE INVENTION

The popularity of gas barbecue grills and related outdoor gas burner devices has increased tremendously over the last twenty-five years. In contrast to charcoal barbecue grills, gas barbecue grills employ a burner assembly that requires a combustible fluid, for example, propane or natural gas, as a fuel source. Barbecue grills with gas burner elements have proven extremely popular with consumers because they provide controlled, uniform heat distribution. In addition, gas burner assemblies are relatively simple to operate, generally require less maintenance and clean-up time, and are suitable for outdoor fireplace devices as well.

There are numerous arrangements and differing structures for burner assemblies used in outdoor devices such as barbecue grills. Often these take the form of elongated burner tubes that are linked together with cross-ignition structures that provide transfer of flame from one row of burner ports to another row of ports. Such cross-ignition structures are sometimes provided as a feature in the are where the burner is ignited by an ignitor at a proximal end of the burner. Other times the cross-ignition feature is provided at the distal or terminal end of the burner. In either arrangement, the cross-ignition structure in conventional burners is located adjacent each row of burner ports, and thereby provides a flame transfer between the two rows. On example of such structure is found in a barbecue grills structure.

An example of a conventual burner assembly having a burner tube arrangement and a cross-ignition structure is found in a portable gas barbecue grill product marketed by the Assignee of the present patent application. That barbecue grill product utilizes a linear burner tube with a first end connected to a fuel source and a second end that is crimped. The burner tube has two distinct rows of burner outlet ports through which fuel exits and flames emanate. Each row of outlet ports is positioned on opposed side walls of the burner tube. At the proximal end of the tube, the bottom wall of the burner tube has an ignition slot that is cooperatively positioned with an ignitor in the firebox. When the ignitor is activated, fuel that has flown through the ignition slot is ignited and the flame is transferred to each of the two rows of outlet ports. Thus, the ignition slot provides cross-ignition of the outlet ports.

Another example of a conventional burner assembly with cross-ignition structure is that of a cast metal linear burner with a set of outlet ports on each of opposed side walls to provide a row of flame on each side of the burner. At one end of the burner, a slot is cut into the end wall to connect the rows of burner ports on each side of the burner. A second slot is also formed in a like manner at the opposite end of the burner. When the burner assembly is installed in the firebox for use, at least one of the slots is located at the ignitor to cross-ignite the rows of burner ports simultaneously. Yet another example of a burner assembly of the prior art construction is U.S. Pat. No. 6,102,029 to Schlosser et al., which is assigned to the Assignee of the present invention.

As shown in FIGS. 3–5, the burner assembly 10 generally comprises a first burner tube 21, a second burner tube 22, a third burner 23, and a crossover tube 24. Other types of such burner and cross-ignition arrangements are available as this feature has become more common in the industry.

Conventional gas burner assemblies, including cast burner elements and burner tubes, sometimes may be susceptible to flame disturbances which can be caused by high winds or the sudden dropping of the grill cover onto the firebox. A disturbance to the flame exiting the burner element or tube can negatively affect its performance. For example, when the cover is in an open position, a gust of wind can enter the firebox and cause the flames to "flicker" or diminish. Also, rapid closing of the barbecue grill, such as by slamming the cover closed, can cause fame disturbance and in some structured may cause the flame to be extinguished. One way in which this issue has been addressed is by standard tests being used in the industry in certain counties. For example, one test used in the barbecue grill industry involves repeated dropping of the grill lid from an elevated distance onto the firebox to observe whether the flame of the burner will be disrupted and potentially extinguish. Of course, depending on the specific structure of a particular grill assembly, the possibility of flame disturbance or extinguishing will vary. Some of the more significant variables may include the size of the firebox, depth of the firebox, depth of the burner location, positioning of structure between the cooking grate and the burner, and whether the burner has single or multiple rows of ports.

Therefore, there is a need for a burner tube assembly that with at least one stabilization structure that maintains and stabilizes the flame region to prevent disturbance and/or extinguishment of the flames. Also, there is a need for a burner assembly with a flame stabilization structure wherein the burner assembly is compact and capable of being employed in a wide variety of cooking chambers. The present invention is provided to resolve such a need and enhance versatility in outdoor gas burner structures.

SUMMARY OF THE INVENTION

The present invention relates to a burner for use with an outdoor flame device. It is one object of the present invention to provide a burner assembly for a barbecue grill in which the burner assembly includes at least one elongated burner tube area having a plurality of burner outlet ports along a linear arrangement defining a burner flame region. The burner has at least one slot positioned transverse to the linear arrangement of burner ports in the flame region, which is adapted to provide a port of a standing pilot flame positioned adjacent at least one burner port. This arrangement is adapted to provide ignition of the flame region in the event of at least partial extinguish of flame.

It is further an object of the present invention to provide a burner with the burner ports positioned along a top wall of the burner, and in which the said slot is positioned on the top wall and extends to at least one adjacent wall. The invention further provides a burner assembly in which the elongated burner is constructed of a tube, with a linear arrangement of burner ports along an extent and a flame stabilizer positioned at a location along the burner ports. The flame stabilizer has an extent that passes transverse to the linear arrangement of the burner ports, and provides a standing pilot to re-lights an extinguished flame in the area of the burner ports.

Other features and advantages of the invention will be apparent from the following specification taken in conjunction with the following drawings.

BRIEF DESCRIPTION OF THE DRAWINGS

FIG. 3 is a cross-section of the burner tube taken along line 3—3 of FIG. 2, showing the flame stabilizing structure;

FIG. 4 is a partial cross-section of the first burner tube taken along line 4—4 of FIG. 2, showing the flame stabilizing structure;

FIG. 5 is a partial perspective view a conventional burner tube having a cross-ignition structure between two distinct rows of burner ports;

FIG. 6 is a partial top plan view of a burner tube having the flame stabilizing structure formed from a plurality of apertures;

FIG. 7 is a cross-section of the burner tube taken along line 7—7 of FIG. 6; and, FIG. 8 is a partial cross-section of the burner tube taken along line 8—8 of FIG. 7.

DETAILED DESCRIPTION OF THE INVENTION

Figure 1:
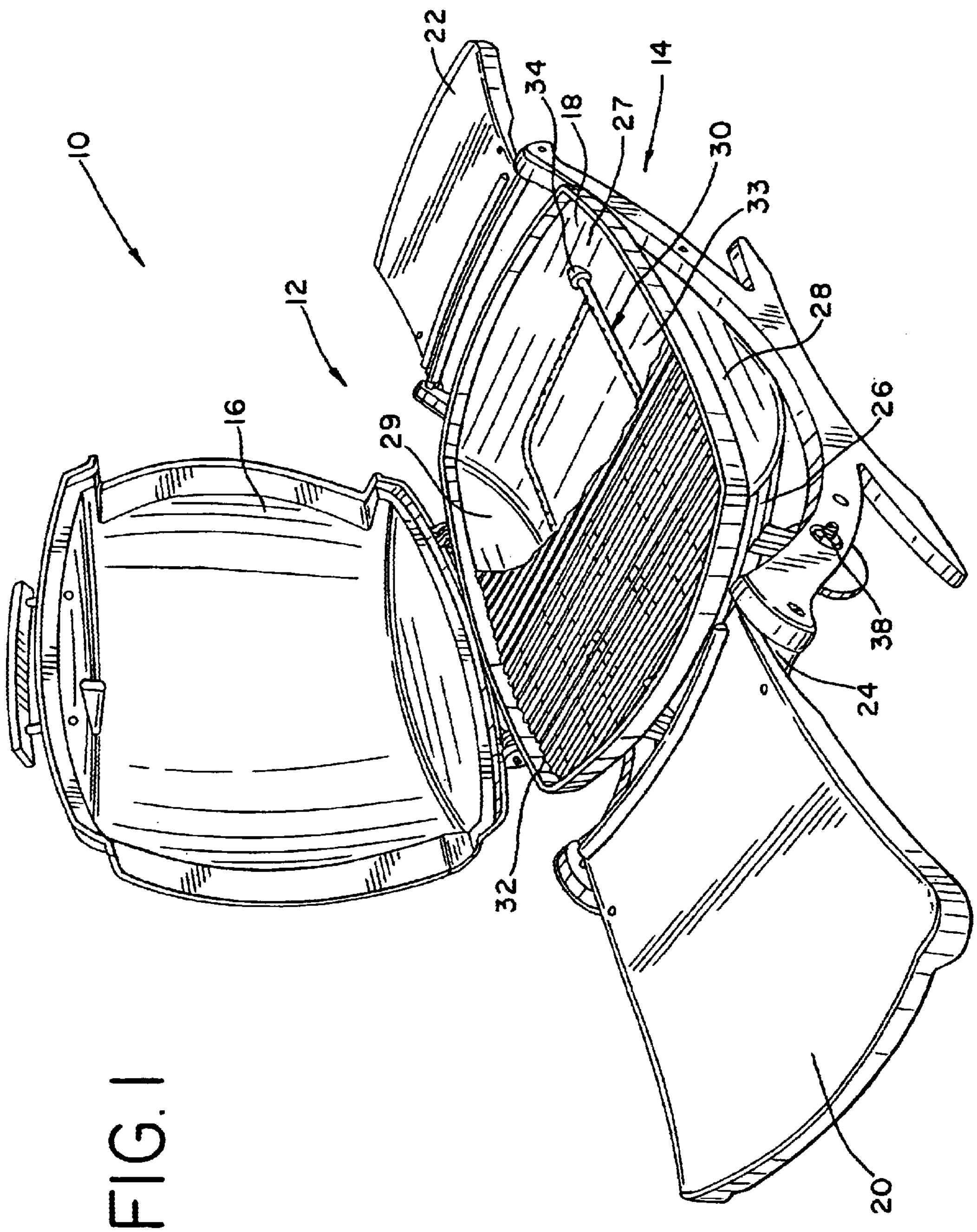
FIG. 1 is a perspective view of a barbecue grill assembly showing a burner tube of the invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. In the preferred form of the invention, the burner is utilized in a barbecue grill cooking assembly. However, in another form of the invention, the burner is utilized in an outdoor fireplace or heater assembly.

A barbecue grill assembly 10 is shown in FIG. 1. The barbecue grill assembly 10 generally includes a cooking chamber 12 and a support frame assembly 14. The frame assembly 14 is adapted to provide support to the cooking chamber 12. The cooking chamber 12 includes a cover 16 hingeably connected to a firebox 18. The barbecue grill assembly 10 further includes a first work surface 20 and a second work surface 22, each operably connected to a transverse member 24 of the support frame assembly 14. The firebox 18 has an interior geometry or configuration defined by a first wall 26, a second wall 27, a front wall 28, and a rear wall 29. As shown in FIG. 1, the first and second walls 26, 27 are sloped or curved.

An elongated burner tube 30 is positioned generally within the firebox 18 of the cooking chamber 12. In the embodiment shown, the burner tube 30 has a multi-directional configuration which results in passageways for the flow of fuel throughout the burner tube 30. In this form, the burner tube 30 has a geometry similar to the interior geometry of the firebox 18 whereby the burner tube 30 is received by the firebox 18. This embodiment of the invention is thereby incorporated into a barbecue grill structure that is disclosed in other detail in the co-pending application that is commonly owned by the Assignee of the present invention, namely U.S. patent application Ser. No. 10/141,690, filed on May 6, 2002. However, the present invention may be used in a variety of other types of barbecue grill structures, and other outdoor gas burner devices, regardless of the details shown in the grill embodiment depicted herein.

According to a preferred embodiment, the burner tube 30 is a cylindrical element with a circular cross-section with an inner wall diameter and an outer wall diameter. Alternatively, the burner 30 may be constructed of other slopes of tubing, or made of elongated burner arrangements of such materials as cast metal. The burner tube 30 is connected to a fuel source (not shown) to define a pathway for flow of the fuel. The burner tube 30 is positioned generally between a cooking grate 32 and a bottom wall 33 of the firebox 18. A portion of the burner tube 30 extends through an opening 34 in the proximal sidewall 26 of the firebox 18. An ignitor 38 is used to ignite fuel as it flows through the burner tube 30.

Figure 2:
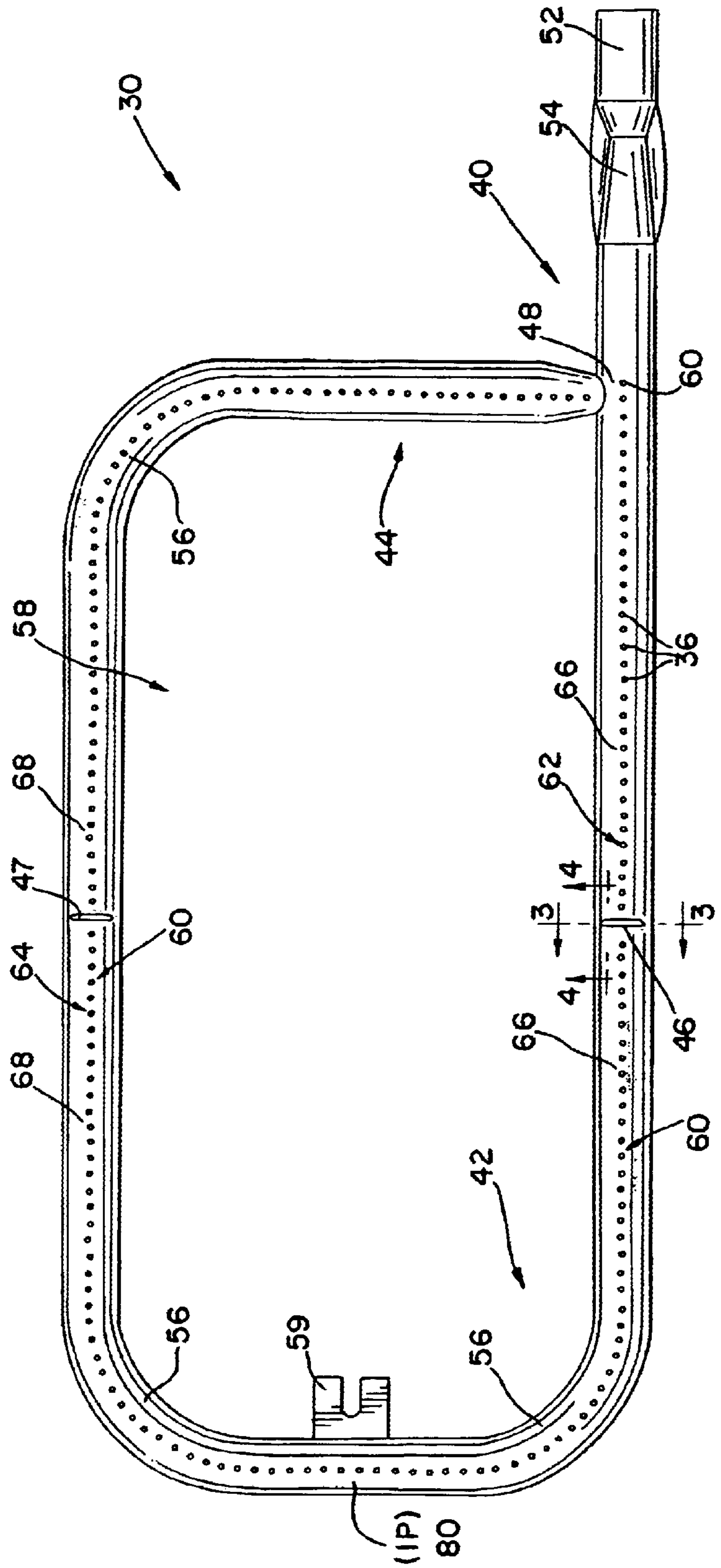
FIG. 2 is a top plan view of the burner tube of FIG. 1, wherein the burner tube has two linear flame stabilizing structures.

Referring to the embodiment shown in FIG. 2, the burner tube 30 has a curvilinear geometric configuration with proximal segment 40, a curvilinear distal segment 42, and a terminal end 44. The burner tube 30 also has a first flame stabilizing structure 46 and a second flame stabilizing structure 47, wherein each is adapted to maintain and stabilize the flame in the burner flame region residing along the linear arrangement of the burner ports 36. The proximal segment 40 is adapted to be connected to a fuel source, i.e., a fuel tank. The distal segment 42 is downstream of the proximal segment 40, meaning that fuel flows from the proximal segment 40 to the distal segment 42. Unlike conventional burner tubes, the terminal end 44 connects to, or mates with the burner tube 30 at a union or interface region 48 of the proximal segment 40. Thus, the union region 48 is a junction zone between the terminal end 44 and the proximal segment 40. The connection between the terminal end 44 and the union region 48 forms a continuous burner tube or burner loop 30 wherein fuel flows in two distinct paths—through the distal segment 42 and through the terminal end 44. This arrangement, as mentioned above, is disclosed in greater detail in the co-pending and commonly owned patent application (Ser. No. 10/141,690). Although shown as having a "P-shaped" or "D-shaped" configuration, the configuration and dimensions of the burner tube 30 can vary. For example, the burner tube 30 can have a round, square, or elliptical configuration. Alternatively, the burner tube 30 may have a linear configuration with proximal and distal segments, and without a union or interface region.

As shown in FIG. 1, the burner tube 30 is positioned within the firebox 18 such that a portion of the proximal segment 40 extends through the aperture 34 in the second wall 27 of the firebox 18. An inlet port 52 and a venturi element 54 of the proximal segment 40 are positioned beyond the firebox 18, and the inlet port 52 is connected to the fuel source. A control valve can be employed to regulate the supply of fuel from the fuel source. Accordingly, fuel from the fuel source passes through the proximal segment 40 and downstream to the distal segment 42 and the terminal end 44.

The distal segment 42 has at least one curvilinear portion 56, which contributes to the generally obround or rectangular configuration of the burner tube 30. As shown in FIG. 2, the distal segment 42 has three curvilinear portions 56. However, the precise number of such portions varies with the overall configuration of the burner tube 30. Due to the mating of the terminal end 44 with the proximal segment 40, the burner tube 30 defines an enclosed central region 58. Although shown as having a generally rectangular configuration, the central region 58 can have a round, square, or elliptical configuration.

The distal segment 42 includes a bracket 59, that in combination with an aperture in the proximal wall 26 of the firebox 18, supports the burner tube 30 within the firebox 18. A ramp or ledge (not shown) of the first wall 26 includes a fastener (not shown) that is cooperatively positioned for engagement with the bracket 59. The bracket 59 and the aperture 50 combine to support the burner tube 30 in an elevated position with respect to the bottom wall of the firebox 18. Preferably, the bracket 59 is welded to the burner tube 30.

Referring to FIG. 2, the burner tube 30 has a plurality of outlet ports or apertures 36 from which a flame F extends (see FIG. 4). The outlet ports 36 are positioned in linear arrangement along an extent of the burner tube 30, such that the burner ports 36 provide a linear arrangement of flame region. In the embodiment shown, the outlet ports 36 are positioned in an upper portion of the burner tube 30, such that the resulting flame is directed towards the grate 32. Preferably, the outlet ports 36 are positioned in the top wall 70 of the burner tube 30 when viewed in cross section (see FIG. 3). Alternatively, the ports 36 are positioned in a side portion of the burner tube 30. Preferably, the outlet ports 36 are positioned throughout the burner tube 30, including the union region 48.

The outlet ports 36 define a flame region 60 of the burner tube 30 during operation of the grill assembly 10. In the embodiment of a burner with a curvilinear configuration, the burner tube 30 may have a number of separate flame region 60—such as in the embodiment shown having a first flame region 62 and a second flame region 64. The flame region 62, 64 represents a collection of flames F that exit individual ports 36 during operation of the barbecue grill assembly 10 (see FIG. 4). The number of flame regions 62, 64 varies with the configuration of the burner tube 30, including the presence or absence of curvilinear portions 56. For example, a triangular burner tube 30 can have three flame regions. The outlet ports 36 are aligned in a generally linear manner and define a first outlet port line 66 and a second outlet port line 68. The port line 66, 68 represents a series of outlet ports 36 through which the flames F exit during operation of the barbecue grill assembly 10. Due to its curvilinear configuration, the burner tube 30 has multiple port lines. The preferred embodiment shown in the Figures includes burner ports 36 arranged in a single line along a port line 66, 68. However, other substantially linear arrangements are contemplated for example, an array of burner ports 36 along a linear path also may be used to provide a substantially linear burner region and flame.

The first flame stabilizing structure 46 and the second flame stabilizing structure 47 have a generally rectangular or "slot" configuration with a width W and a length L. Preferably, the first flame stabilizing structure 46 and second flame stabilizing structure 47 have the same configuration, however, their configurations may differ if so desired. Referring to FIG. 3, the stabilizing structure 46, 47 is preferably positioned in a top wall 70 of burner tube 30. Described in a different manner, the stabilizing structure 46, 47 is positioned in an upper portion of the burner tube 30 between an inner wall 72 and an outer wall 74 of the burner tube 30. The length L of the stabilizing structure 46, 47 is less than the inner diameter ID of the burner tube 30, however, the length L varies with the design parameters of the burner tube 30. The depth of the stabilizing structure 46, 47 is determined by the thickness of the burner tube 30. According to one aspect of the invention, the stabilizing structure 46 is a slot cut into the tube that extends around the sides of the tube 30 beyond the linear arrangement of the burner parts 36. As described above, when the ports 36 are positioned along the top wall 70, the slot passes into the inner and outer walls 72, 74 of the burner tube 30. In alternative embodiments in which the ports 36 are arranged along sides of the burner 30 the slot preferably passes into adjacent areas of the tube 30, such as the top wall area and bottom wall area.

Referring to FIG. 4, the stabilizing structure 46, 47 is positioned between a pair of outlet ports 36. Preferably, the stabilizing structure 46, 47 bisects the distance between a pair of ports 36, however, the stabilizing structure 46, 47 can be positioned closer to one or the other of adjacent ports 36. An edge 46*a* of the stabilizing structure 46 extends from the top wall 70 towards the inner wall 72 of the burner tube 30.

Taken together, FIGS. 2–4 show that each flame stabilizing structure 46, 47 is positioned transverse to the flame region 62, 64 and the port line 66, 68. Preferably, the first stabilizing structure 46 is positioned substantially perpendicular to the first substantially linear flame region 62 defined by the first port line 66. Described in a different manner, the first flame stabilizing structure 46 intersects the first flame region 62 and the first port line 66. Similarly, the second flame stabilizing structure 47 is positioned transverse to the second flame region 64 and the second port line 68. Preferably, the second stabilizing structure 47 is positioned substantially perpendicular to the second flame region 64 and the second port line 68. Described in a different manner, the second flame stabilizing structure 46 intersects the second substantially linear flame region 64 defined by the second port line 68. The first flame stabilizing structure 46 is positioned downstream of the union region 48, preferably between the proximal segment 40 and the distal segment 42. The second flame stabilizing structure 47 is positioned downstream of the first flame stabilizing structure 46, preferably between the distal segment 42 and the terminal end 44. The distance between the first flame stabilizing structure 46 and the second flame stabilizing structure 47 varies with the design of the burner tube 30.

Although the burner 30 is shown as having two flame stabilizing structures 46, 47, the burner 30 can have any number of flame stabilizing structures including a single flame stabilizing structure. In the event that the burner tube 30 has a single flame stabilizing structure, that structure can be positioned in a variety of locations downstream of the inlet port 52. In the event that the burner tube 30 has three or more flame stabilizing structures, the structures can be positioned throughout the burner tube 30 including the curvilinear portion 56.

The dimensions of the flame stabilizing structure 46, 47 varies with the design parameters of the burner tube 30. In a preferred embodiment, the burner tube 30 is a round tube with an inner diameter in the range of 0.75 inch to 1 inch, and the flame stabilizing structure 46, 47 has a length L of 0.50 inch and a width W of 0.020 inch. In other forms of specific types of elongated burners 30, such as non-round tubes or elongated cast metal burners, the stabilizing structure 46 may comprise a slot that transects the line of burner ports 36 and passes into areas of the burner 30 adjacent the line of ports 36. For example, use of the present invention with a burner that has a row of ports 36 along the side of the burner would include a slot extending from at least the top or bottom of the burner and transects the line of ports 36. This arrangement is achieved regardless of the shape of the burner 30 in cross-section, so long as the stabilizing structure 46 extends at least some extent beyond the line of ports 36 and transects the port line.

During operation of the barbecue grill assembly 10, fuel flows through the burner tube 30 and exits the ports 36. Initially, the ignitor 38 (see FIG. 1) is used to ignite the fuel that has flowed through the through the burner tube 30 and exited the ports 36. Since a portion of the ignitor 38 is positioned in the lower portion of the firebox 18 near the bracket 59, combustion of the fuel first occurs in the ignition region 80. However, fuel flows throughout the burner tube 30 and fuel exits the outlet ports 36 during operation of the grill assembly 10 forms the first flame region 62 and the second flame region 64. Specifically, fuel that exits the ports 36 at the first port line 66 forms the first flame region 62 and fuel that exits the ports 36 at the second port line 68 forms the second flame region 64. In addition, fuel that exits the flame stabilizing structures 46,47 is combusted. As a result, fuel that exits the first stabilizing structure 46 during operation of the grill assembly 10 forms a portion of the first flame region 62 and fuel that exits the second stabilizing structure 47 forms a portion of the second flame region 64. Due to the increased geometry of the stabilizing structure 46 47, a greater amount of fuel exits the stabilizing structure 46, 47 compared to the outlet ports 36. Consequently, and as shown in FIG. 4, the flame $F_s$ formed at the stabilizing structure 46, 47 is generally larger than the flame F formed exiting one of the ports 36. Also, the flame $F_s$ formed at the stabilizing structure 46 is located along an area of the burner wall beyond the region of the linear arrangement of the burner ports 36. This is achieved by the structure wherein the stabilizing structure 46 has an extent that passes transverse to the linear arrangements of the burner ports 36.

During operation of the barbecue grill assembly 10 and while food is being cooked on the grate 32, the cover 16 is typically lifted between an open position and a closed position many times. When the cover 16 is in the open position (see FIG. 1), an increased quantity or gust of wind can enter the firebox 18. If a conventional burner tube is utilized in some grill assemblies, a significant gust of wind can affect the flames exiting the burner tube. For example, a gust of wind can cause the burner tube flames to "flicker" or diminish to a degree. In some grill arrangements, a significant gust of wind may potentially extinguish the flames of the burner tube, causing an unintended extinguishment of the flame. An unintended extinguishment of the flame exiting the burner tube may also be caused by abusive conditions of closure of the cover 16. One example of this is by an industry test utilized in the barbecue grill industry. The barbecue grill industry has developed a standard test used in certain parts of the world to measure susceptibility to unintended extinguishment of burner flames in a grill assembly. In that test, an attached hood or cover is elevated six feet above the firebox and dropped five times, once every thirty seconds. The flames exiting the burner tube in the grill assembly is monitored for signs of disturbance, including flickering and smothering, or extinguishment. Since the flame stabilizing structure 46, 47 of the present invention generally prevents severe disturbance or extinguishment of the flames exiting the burner tube 30, the burner tube 30 and the grill assembly 10 assist with passing this industry test. Therefore, while only certain barbecue grill configurations may have difficulties caused by flame disturbances, and thereby unable to pass the industry test, the present invention provides a solution to that situation.

The flame stabilizing structure 46, 47 of the present burner tube 30 helps prevent unintended extinguishment of the flames F exiting the burner tube 30. Since the stabilizing structure 46, 47 has a larger configuration or geometry than the outlet port 36, the flame $F_s$ formed at the stabilizing structure 46, 47 is larger than the flame F formed at the outlet port 36. Consequently, the flame stabilizing structure 46, 47 is less susceptible to unintended extinguishment from abusive conditions such as slamming closed the cover 16. Thus the flame $F_s$ is likely to remain lit at the flame stabilizing structure 46, 47 in abuse conditions. Also, because the stabilizing structure 46, 47 includes a flame port that has a linear extent transverse to the linear arrangement of the burner ports, and that extends into adjacent areas of the burner sidewall, the stabilizing structure 46, 47 provides a stabilizing flame port that is resistant to being extinguished by abuse conditions. Due to the fluid nature of the fuel and the positioning of the flame stabilizing structure 46, 47 with respect to flame region 62, 64, the flame stabilizing structure 46, 47 functions as a standing-pilot to relight the flames F that were extinguished, including those in the flame region 62, 64. Accordingly, the flame stabilizing structure 46, 47 functions as a standing-pilot that resists unintended extinguishment and provides for the relighting of extinguished flames F in the flame region 62, 64 and along the burner tube 30.

The structure of the present invention is distinguishable from structures in conventional burners that provide transfer of flame from one line of gas ports to another such line of ports. Also, the present invention should be understood as distinct from conventional burner structures having such a cross-ignition structure at an ignition port area. As is shown in FIG. 5, (showing a portion of an elongated burner with conventional structure), a conventional burner tube 130 has a first set of outlet ports 136 in a first sidewall 132 of the tube 130 and a second set of outlet ports 162 in an opposed second sidewall 134. The first set of outlet ports 136 defines a first port line 164, while the second set of outlet ports 162 define a second port line 166. The burner tube 130 has no structures in the top wall 136. Instead, an ignition slot 170 is positioned in a bottom wall 138 and generally between the first and second sidewalls 132, 134. The ignition slot 170 does not intersect either the first or second port lines 164, 166. The conventional burner tube 130 has a first end coupled to a fuel source and a closed or crimped second end. The ignition slot 170 is typically positioned near the second end and an ignitor.

The function of the ignition slot 170 is to ignite fuel that flows through both the first and second sets of outlet ports 136, 162. Although not shown in FIG. 5, the ignition slot 170 is positioned near an ignitor when the burner tube 130 is installed in a cooking chamber. This means that the top wall 136 of the burner tube 130 is directed towards the cooking grate of the firebox and the bottom wall 138 of the burner tube 130 is directed towards a bottom wall of the firebox. Typically, the ignitor is positioned between the bottom wall 138 of the burner tube 130 and the bottom wall of the firebox, thereby requiring the ignition slot 170 to be positioned towards the bottom wall of the firebox and not towards the cooking grate or cover. When the ignitor is activated, fuel that flows through the ignition slot 170 is first ignited. Because the resulting flame from the ignition slot 170 is directed upward, meaning towards the side wall 132, 134 and the top wall 136, fuel exiting the first and second set of ports 162, 164 is ignited. In this manner, the ignition slot 170 provides cross-ignition for the sets of ports 162, 164.

Unlike the conventional linear burner tube 130, the burner tube 30 of the present invention provides a flame stabilizing structure 46, 47 that intersects the line of burner ports, and extends into adjacent areas of the burner wall. Also, in a preferred embodiment, the present invention provides a flame stabilizing structure 46, 47 positioned in the top wall 70 of the burner tube 30 and the resulting flame is directed upward towards the cooking grate 32. In addition, the first flame stabilizing structure 46 intersects the first port line 66 and the second flame stabilizing structure 47 intersects the second port line 68. In contrast to the conventional burner tube 130, neither the first flame stabilizing structure 46 nor the second flame stabilizing structure 47 are required to be positioned near an ignitor.

In another preferred embodiment shown in FIGS. 6–8, the burner tube 230 has a flame stabilizing structure 246 with a different configuration from that shown in FIGS. 1–4. The flame stabilizing structure 246 is positioned in a top wall 270 of the burner tube 230. The burner tube 230 has a plurality of outlet ports 236 in linear arrangement along the top wall 270 that define a flame region 262 during operation of the burner tube 230. The flame stabilizing structure 246 is positioned generally perpendicular to the flame region 262. The outlet ports 236 define a port line 266 and the flame stabilizing structure 246 is positioned generally perpendicular to the port line 266.

Unlike the flame stabilizing structure 46 of FIGS. 1–4, the flame stabilizing structure 246 is formed from a plurality or collection of apertures 250. Although each aperture 250 is shown in FIG. 6 as having a smaller configuration than that of the outlet port 236, the configuration of the aperture 250 can be varied with the design parameters of the burner tube 230. Similarly, the precise number of apertures 250 that collectively form the flame stabilizing structure 246 can vary from the five shown in FIG. 6. For example, the flame stabilizing structure 246 can be formed from three larger apertures 250 that are spaced in the top wall 270 and positioned generally transverse to the flame region 262 and the port line 266.

While the specific embodiments have been illustrated and described, numerous modifications come to mind without significantly departing from the spirit of the invention and the scope of protection is only limited by the scope of the accompanying Claims.

I claim:

1. A gas burner assembly for a barbecue grill, comprising:

an elongated burner tube having a plurality of outlet ports in an outer wall of the burner tube, the outlet ports linearly aligned to define a flame region in the outer wall, and at least one slot that provides a standing pilot flame for ignition of the flame region in the event of at least partial extinguishment of the flame region, wherein the slot is positioned in the burner tube proximate an outlet port, and wherein the slot extends beyond the flame region and into an adjacent outer wall area.

2. The burner assembly of claim 1, wherein the slot has a length and the burner tube has an inner diameter, and wherein the ratio of the slot length to the tube inner diameter is approximately 2:3.

3. The burner assembly of claim 2, wherein the slot length is at least 0.5 inch.

4. The burner assembly of claim 2, wherein the tube inner diameter is at least 0.75 inch.

5. The burner assembly of claim 1, wherein the slot extends between a first outer wall area and a second outer wall area, wherein each wall area is positioned adjacent the flame region.

6. The burner assembly of claim 5, wherein the flame region is positioned between the first and second outer wall areas.

7. The burner assembly of claim 1, wherein the burner tube has a proximal end and a distal end that is in fluid communication with a union region of the burner tube to form a continuous burner loop.

8. The burner assembly of claim 7, wherein the burner tube has a P-shaped configuration.

9. The burner assembly of claim 7, wherein the burner tube has a first slot positioned near the union region and a second slot positioned near the distal end of the burner tube.

10. A gas burner assembly for use with a barbecue grill, comprising:

a burner tube in fluid communication with a fuel source, the burner tube having a substantially linear path of outlet ports in a top wall of the tube that define a burner flame region, and at least one flame stabilizer slot positioned adjacent one of said outlet ports to provide a standing pilot flame for re-ignition of the flame region, the stabilizer slot having an arc length that exceeds the linear path of the outlet ports such that the stabilizer slot extends from the top wall beyond the flame region and into an adjacent wall of the burner.

11. The burner assembly of claim 10, wherein the flame stabilizer slot has opposed first and second ends, the first end residing in a first wall area adjacent the flame region and the second end residing in a second wall area adjacent the flame region.

12. The burner assembly of claim 11, wherein a line directed radially inward from the first slot end to a central longitudinal axis of the burner tube intersects a line directed radially inward from the second slot to the axis, the lines defining an acute angle.

13. The burner assembly of claim 12, wherein the two intersecting lines define an angle between 30 and 60 degrees.

14. The burner assembly of claim 11, wherein a line directed radially inward from the first slot end to a central longitudinal axis of the burner tube intersects a line directed radially inward from the second slot to the axis, the lines defining an obtuse angle.

15. The burner assembly of claim 11, wherein the first slot end is positioned at least 45 degrees from the flame region, and wherein the second slot end is positioned at least 45 degrees from the flame region.

16. The burner assembly of claim 10, wherein the burner tube has a proximal end and a distal end that is in fluid communication with a union region of the burner tube to form a continuous loop for the passage of fuel throughout the burner tube.

17. The burner assembly of claim 16, wherein the burner tube has a first slot positioned near the union region and a second slot positioned near the distal end of the burner tube.

18. A gas burner assembly for use with a barbecue grill, comprising;

a burner tube having a proximal end and a distal end that is in fluid communication with a union region of the burner tube to form a continuous loop, the burner tube having a substantially linear path of outlet ports that define a burner flame region in an outer wall of the tube, and at least one flame stabilizer positioned adjacent one of said outlet ports to provide a standing pilot flame for re-ignition of the flame region, the stabilizer having opposed first and second ends, wherein the first end extends into a first adjacent wall area beyond the flame region, and wherein the second end extends into a second adjacent wall area beyond the flame region.

19. The burner assembly of claim 18 wherein the stabilizer is a slot with an arc length of at least 0.5 inch.

20. The burner assembly of claim 19, wherein a circumference of the burner tube is approximately four times greater than the arc length of the stabilizer slot.

21. The burner assembly of claim 18, wherein the first slot end is positioned in a first quadrant and the second slot end is positioned in a second quadrant when the burner tube is viewed in section.

22. The burner assembly of claim 18, wherein the slot has a length and the burner tube has an inner diameter, and wherein the ratio of the slot length to the tube inner diameter is approximately 2:3.

23. The burner assembly of claim 22, wherein the slot length is at least 0.5 inch.

24. The burner assembly of claim 22, wherein the tube inner diameter is at least 0.75 inch.

25. The burner assembly of claim 18, wherein the burner tube has a first stabilizer positioned near the union region and a second stabilizer positioned near the distal end of the burner tube.

26. The burner assembly of claim 18, wherein a line directed radially inward from the first slot end to a central longitudinal axis of the burner tube intersects a line directed radially inward from the second slot end to the axis, the lines defining an angle greater than 45 degrees.

* * * * *